(12) United States Patent
Wahlander et al.

(10) Patent No.: US 8,155,665 B2
(45) Date of Patent: Apr. 10, 2012

(54) ADAPTIVE RECEIVER BASED ON MOBILITY INFORMATION OF USER DEVICE

(75) Inventors: Timo Wahlander, Malmo (SE); Marcus Liwell, Malmo (SE)

(73) Assignee: Sony Ericsson Mobile Communications AB, Lund (SE)

( * ) Notice: Subject to any disclaimer, the term of this patent is extended or adjusted under 35 U.S.C. 154(b) by 274 days.

(21) Appl. No.: 12/465,294

(22) Filed: May 13, 2009

(65) Prior Publication Data

US 2010/0291951 A1  Nov. 18, 2010

(51) Int. Cl.
*H04W 24/00* (2009.01)
(52) U.S. Cl. ................... 455/456.1
(58) Field of Classification Search ..... 455/456.1–456.6
See application file for complete search history.

(56) References Cited

U.S. PATENT DOCUMENTS

| | | | | |
|---|---|---|---|---|
| 2003/0198285 | A1* | 10/2003 | Qi et al. | 375/148 |
| 2004/0002352 | A1* | 1/2004 | Sendonaris | 455/522 |
| 2004/0235479 | A1* | 11/2004 | Cho et al. | 455/441 |
| 2007/0019587 | A1* | 1/2007 | Okamoto et al. | 370/335 |
| 2007/0225026 | A1 | 9/2007 | Bennett | |

FOREIGN PATENT DOCUMENTS

| | | |
|---|---|---|
| EP | 1 628 498 A2 | 2/2006 |
| EP | 2 161 854 A2 | 3/2010 |
| WO | WO 2006/065434 A2 | 6/2006 |

OTHER PUBLICATIONS

Notification of Transmittal of the International Search Report and the Written Opinion of the International Searching Authority of the Declaration, corresponding to PCT/IB2009/054378, mailed Apr. 8, 2010, 16 pages.
International Preliminary Report on Patentability dated Oct. 28, 2011 issued in corresponding PCT application No. PCT/IB2009/054378, 12 pages.

* cited by examiner

*Primary Examiner* — Steven Lim
(74) *Attorney, Agent, or Firm* — Snyder, Clark, Lesch & Chung, LLP

(57) ABSTRACT

A method includes a user device connecting to another device, receiving position-based signals associated with the user device, calculating mobility information associated with the user device based on the position-based signals, providing the mobility information to a receiver of the user device, and adapting one or more parameters associated with a connection between the receiver and the other device based on the mobility information.

20 Claims, 5 Drawing Sheets

ADAPTIVE RECEIVER BASED ON MOBILITY INFORMATION OF USER DEVICE

BACKGROUND

With the development of wireless devices, such as portable, handheld, and mobile devices, users may access and exchange information anywhere and anytime. While a user's mobility may add certain complexities with respect to maintaining connectivity, the wireless device may utilize various techniques to maintain a particular level of quality of service with respect to connectivity. For example, Doppler estimation may be utilized to optimize wireless communications by calculating the velocity of the user device. Unfortunately, Doppler estimation suffers from inaccuracies based on poor noise immunity and low-order moment estimates.

SUMMARY

According to one aspect, a method may include connecting, by the user device, to another device, receiving, by the user device, position-based signals associated with the user device, calculating, by the user device and based on the position-based signals, mobility information associated with the user device, providing, by the user device, the mobility information to a receiver of the user device; and adapting, by the user device, one or more parameters associated with a connection between the receiver and the other device based on the mobility information.

Additionally, where the adapting may include adapting channel estimation coefficients.

Additionally, where the adapting may include adapting channel fading coefficients.

Additionally, where the method may include providing by the user device, the mobility information to a transmitter of the user device, and adapting, by the user device, power control parameters associated with a transmission between the transmitter and the other device based on the mobility information.

Additionally, the method may include supplementing a Doppler estimation of a velocity of the user device with the mobility information that may include a velocity estimate of the user device.

Additionally, the method may include supplementing a signal-to-noise estimate with the mobility information when adapting one or more parameters associated with power control Additionally, the method may include estimating mobility information from an accelerometer when the position-based signals are not received.

According to another aspect, a user device may be configured to connect to a wireless network, receive geographic location information of the user device, calculate mobility information based on the geographic location information, provide the mobility information to at least one of a receiver or a transmitter of the user device, and adapt, based on the mobility information, one or more parameters associated with a connection between the user device and the wireless network.

Additionally, the user device may be configured to calculate an estimate of a velocity of the user device based on a Doppler estimation associated with a transmission from the wireless network to the user device, where the mobility information includes another estimate of a velocity of the user device, and utilize both the estimate of the velocity of the user device that is based on the Doppler estimation and the other estimate of the velocity of the user device to adapt the one or more parameters.

Additionally, where the mobility information may include an estimate of a velocity of the user device, and the user device may be configured to utilize the estimate of the velocity of the user device as an initial estimate, and calculate another estimate of a velocity of the user device based on a Doppler estimation and the initial estimate.

Additionally, where the user device may include a wireless telephone.

Additionally, where the geographic location information may include global positioning system signals.

Additionally, where the user device may be configured to provide the mobility information to the wireless network.

Additionally, where the one or more parameters may include pre-filtering parameters.

Additionally, where the one or more parameters may include channel estimation coefficients.

Additionally, where the one or more parameters may include channel fading coefficients.

Additionally, where the user device may be configured to calculate a velocity of the user device based on a Doppler estimation and the mobility information.

According to still another aspect, a computer-readable medium may contain instructions executable by at least one processor. The computer-readable medium may store instructions for obtaining position-based signals associated with a mobile device, calculating an estimate of a velocity of the mobile device based on the position-based signals, calculating another estimate of the velocity of the mobile device based on a Doppler estimation, and adapting one or more parameters associated with a transceiver of the mobile device based on the estimate and the other estimate of the velocity of the mobile device.

Additionally, the one or more parameters may include at least one of a power control parameter, a filtering parameter, a channel estimation parameter, or a channel fading parameter.

Additionally, the mobile device may include the computer-readable medium.

BRIEF DESCRIPTION OF THE DRAWINGS

The accompanying drawings, which are incorporated in and constitute a part of this specification, illustrate exemplary embodiments described herein and, together with the description, explain these exemplary embodiments. In the drawings.

DETAILED DESCRIPTION

The following detailed description refers to the accompanying drawings. The same reference numbers in different drawings may identify the same or similar elements. Also, the following description does not limit the invention.

The term "mobility information," as used herein, is intended to be broadly interpreted to include information relating to a mobility state of a user associated with a user device. For example, mobility information may include information as to whether the user is stationary or moving. Mobility information may include speed, velocity, acceleration, and/or other types of navigation information. Mobility information may include geographic positional information.

Overview

Embodiments described herein relate to a receiver or a transceiver (referred to generally as a receiver) of a user device that utilizes mobility information associated with a user of the user device. The user device may obtain mobility information according to conventional techniques, such as, for example, a position-based scheme (e.g., a global positioning system (GPS), triangulation, trilateration, or the like) and/or an accelerometer. The receiver may adapt various parameters associated with receiving signals and/or transmitting signals based on the mobility information. In instances where the user device estimates, for example, velocity of the user device, based on Doppler estimation, mobility information may be utilized to supplement or replace the velocity estimation associated with Doppler estimations.

Figure 1:
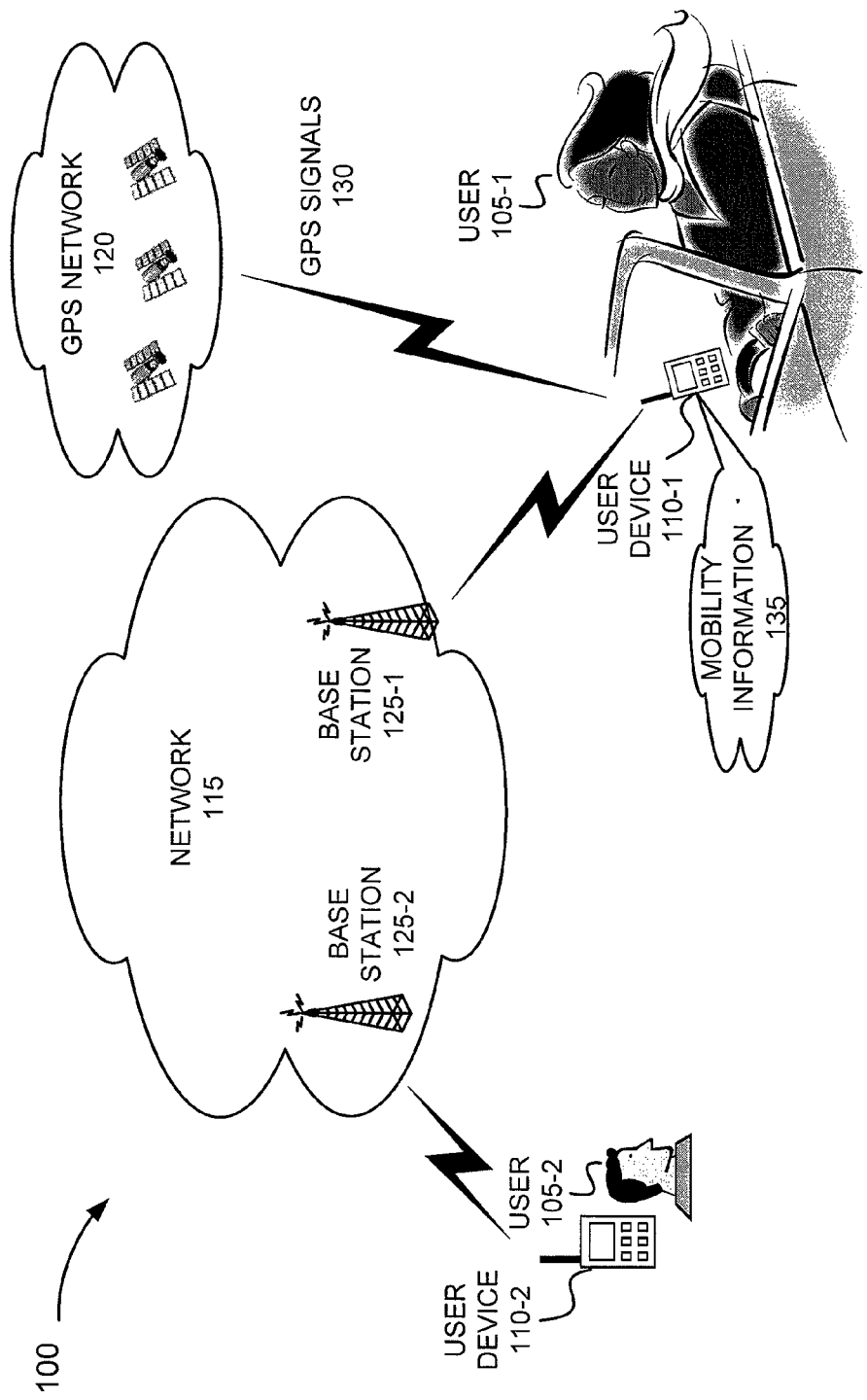
FIG. 1 is a diagram illustrating an overview of an exemplary embodiment described herein.

FIG. 1 is a diagram illustrating an overview of an exemplary embodiment described herein. As illustrated, an environment 100 may include users 105-1 and 105-2 (referred to generally as "user 105") operating user devices 110-1 and 110-2 (referred to generally as "user device 110"), respectively. User devices 110-1 and 110-2 may be communicatively coupled to network 115 via base stations 125-1 and 125-2, respectively. Network 115 may include a GPS network 120. User device 110-1 may receive GPS signals 130 from GPS network 120.

In an exemplary scenario, assume that user 105-1 is communicating with user 105-2 while driving in a vehicle. User device 110-1 may estimate mobility information 135 (e.g., velocity) of user device 110-1 based on GPS signals 130. The estimated mobility information 135 may be utilized to adapt various parameters associated with a receiver of user device 110-1. For example, fading channel coefficients, channel estimation, power control, and/or filtering may be adapted based on estimated mobility information 135. Additionally, or alternatively, mobility information 135 may be utilized to adapt various parameters associated with a transmitter of user device 110-1.

As a result of the foregoing, mobility information may be utilized to improve the adaptation of parameters associated with the receiver and/or transmitter. The mobility information may be utilized to supplement and/or replace other known techniques to adapt receive and/or transmit parameters. The embodiment has been broadly described with respect to FIG. 1. Accordingly, a detailed description and variations to this embodiment is provided below.

Exemplary Device

Figure 2:
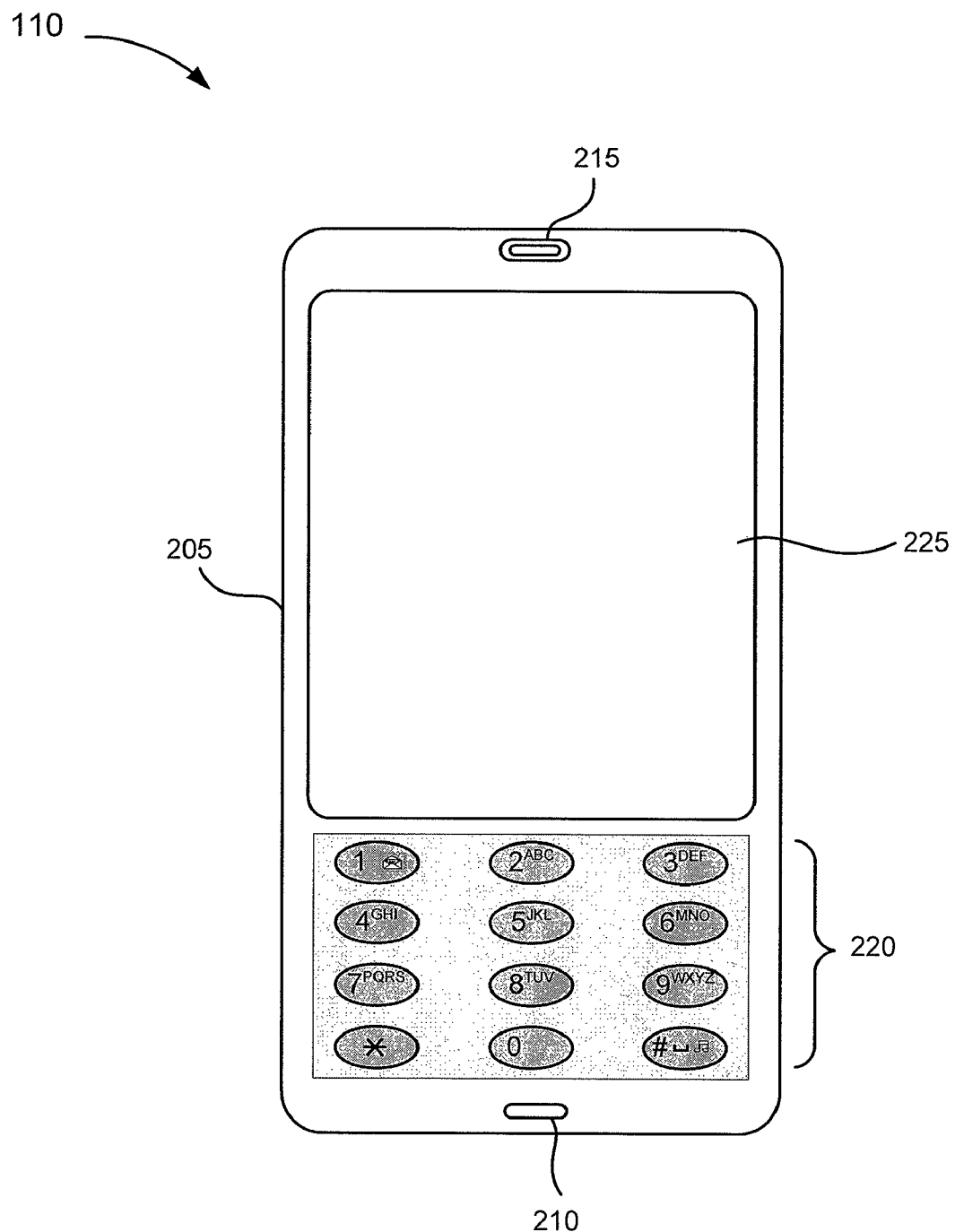
FIG. 2 is a diagram illustrating an exemplary user device in which the embodiments described herein may be implemented.

FIG. 2 is a diagram of an exemplary user device 110 in which the embodiments described herein may be implemented. The term "user device," as used herein, is intended to be broadly interpreted to include a variety of communication devices. For example, user device 110 may include a portable device, a mobile device, or a handheld device, such as a wireless telephone (e.g., a smart phone or a cellular phone), a personal digital assistant (PDA), a pervasive computing device, a computer, or another kind of communication device.

As illustrated in FIG. 2, user device 110 may include a housing 205, a microphone 210, a speaker 215, a keypad 220, and a display 225. In other embodiments, user device 110 may include fewer, additional, and/or different components, or a different arrangement of components than those illustrated in FIG. 2 and described herein. For example, user device 110 may include a camera, a video capturing component, and/or a flash for capturing images and/or video.

Housing 205 may include a structure to contain components of user device 110. For example, housing 205 may be formed from plastic, metal, or some other material. Housing 205 may support microphone 210, speaker 215, keypad 220, and display 225.

Microphone 210 may transduce a sound wave to a corresponding electrical signal. For example, a user may speak into microphone 210 during a telephone call or to execute a voice command. Speaker 215 may transduce an electrical signal to a corresponding sound wave. For example, a user may listen to music or listen to a calling party through speaker 215. Speaker 215 may include multiple speakers.

Keypad 220 may provide input to user device 110. Keypad 220 may include a standard telephone keypad, a QWERTY keypad, and/or some other type of keypad. Keypad 220 may also include one or more special purpose keys. In one implementation, each key of keypad 220 may be, for example, a pushbutton. A user may utilize keypad 220 for entering information, such as text, or for activating a special function.

Display 225 may output visual content and may operate as an input component (e.g., a touch screen). For example, display 225 may include a liquid crystal display (LCD), a plasma display panel (PDP), a field emission display (FED), a thin film transistor (TFT) display, or some other type of display technology. Display 225 may display, for example, text, images, and/or video to a user.

In one implementation, display 225 may include a touch-sensitive screen. Display 225 may correspond to a single-point input device (e.g., capable of sensing a single touch) or a multipoint input device (e.g., capable of sensing multiple touches that occur at the same time). Display 225 may implement, for example, a variety of sensing technologies, including but not limited to, capacitive sensing, surface acoustic wave sensing, resistive sensing, optical sensing, pressure sensing, infrared sensing, gesture sensing, etc. Display 225 may display various images (e.g., icons, a keypad, etc.) that may be selected by a user to access various applications and/or enter data. Display 225 may also include an auto-rotating function. Display 225 may serve as a viewfinder when user device 110 includes a camera or a video capturing component.

Figure 3:
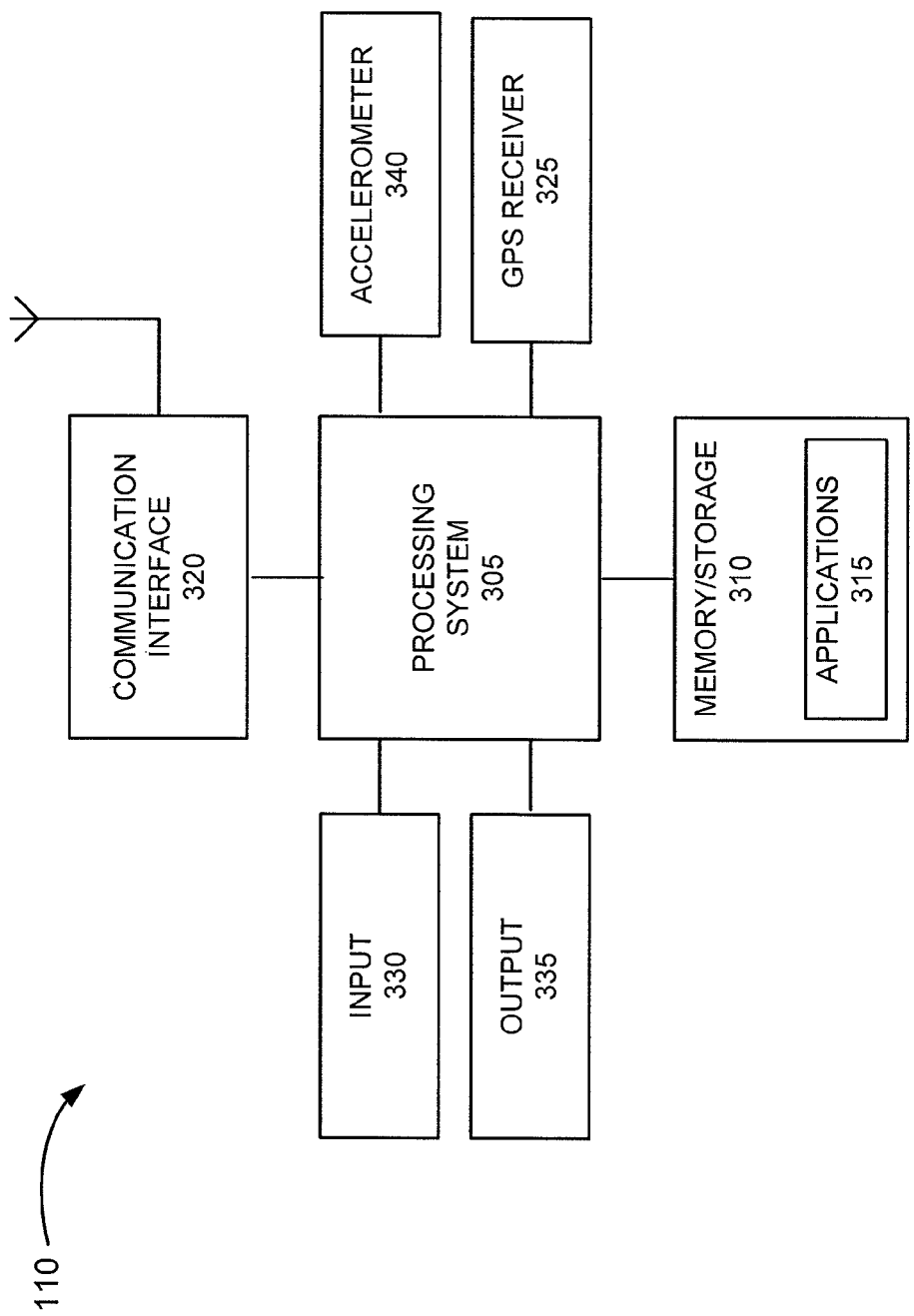
FIG. 3 is a diagram illustrating exemplary components of the user device depicted in FIG. 2.

FIG. 3 is a diagram illustrating exemplary components of user device 110. As illustrated, user device 110 may include a processing system 305, a memory/storage 310 (e.g., containing applications 315), a communication interface 320, a GPS receiver 325, an input 330, an output 335, and an accelerometer 340. In other embodiments, user device 110 may include fewer, additional, and/or different components, or a different arrangement of components than those illustrated in FIG. 3 and described herein. For example, GPS receiver 325 may be implemented in or considered a part of communication interface 320.

Processing system 305 may include one or multiple processors, microprocessors, data processors, co-processors, network processors, application specific integrated circuits (ASICs), controllers, programmable logic devices, chipsets, field programmable gate arrays (FPGAs), and/or some other component that may interpret and/or execute instructions and/or data. Processing system 305 may control the overall operation (or a portion thereof) of user device 110 based on an operating system and/or various applications.

Processing system 305 may access instructions from memory/storage 310, from other components of user device 110, and/or from a source external to user device 110 (e.g., a network or another device). Processing system 305 may provide for different operational modes associated with user device 110. Additionally, processing system 305 may operate in multiple operational modes simultaneously. For example, processing system 305 may operate in a camera mode, a music playing mode, a radio mode (e.g., an amplitude modulation/frequency modulation (AM/FM) mode), and/or a telephone mode.

Memory/storage 310 may include memory and/or secondary storage. For example, memory/storage 310 may include a random access memory (RAM), a dynamic random access memory (DRAM), a read only memory (ROM), a programmable read only memory (PROM), a flash memory, and/or some other type of memory. Memory/storage 310 may include a hard disk (e.g., a magnetic disk, an optical disk, a magneto-optic disk, a solid state disk, etc.) or some other type of computer-readable medium, along with a corresponding drive. The term "computer-readable medium," as used herein, is intended to be broadly interpreted to include a memory, a secondary storage, a compact disc (CD), a digital versatile disc (DVD), or the like. For example, a computer-readable medium may be defined as a physical or logical memory device. A logical memory device may include memory space within a single physical memory device or spread across multiple physical memory devices.

Memory/storage 310 may store data, application(s), and/or instructions related to the operation of user device 110. For example, memory/storage 310 may include a variety of applications 315, such as, an e-mail application, a telephone application, a camera application, a voice recognition application, a video application, a multi-media application, a music player application, a visual voicemail application, a contacts application, a data organizer application, a calendar application, an instant messaging application, a texting application, a web browsing application, a location-based application (e.g., a GPS-based application), a blogging application, and/or other types of applications (e.g., a word processing application, a spreadsheet application, etc.).

Communication interface 320 may permit user device 110 to communicate with other devices, networks, and/or systems. For example, communication interface 320 may include an Ethernet interface, a radio interface, a microwave interface, or some other type of wireless and/or wired interface. Communication interface 320 may include a transmitter and a receiver.

GPS receiver 325 may include an antenna/receiver to receive signals (e.g., GPS satellite broadcasts or other forms of positional signals). A variety of technologies or techniques (e.g., GPS, cellular positioning methods (e.g., triangulation, etc.), local positioning methods (e.g., Bluetooth, IEEE 802.11, Ultra Wide Band, etc.)) exist to identify a geographic location associated with user 105 or user device 110. However, these technologies may provide user's 105 geographic location or the geographic location of user device 110 with different degrees of precision and/or accuracy.

While GPS is a popular technology that enables user 105 or user device 110 to obtain geographic location information, GPS typically does not work well inside buildings or underground due to the absence of line of sight to satellites and attenuation and scattering of signals caused by roofs, walls, and other objects. In this regard, other technologies, such as, for example, an indoor positioning system (IPS) or triangulation may be utilized. Thus, while the description that follows may describe embodiments that utilize GPS, other technologies or techniques may be utilized to obtain the geographic location of user 105 or user device 110, as well as other types of mobility information, such as, velocity, etc.

Input 330 may permit a user and/or another device to input information to user device 110. For example, input 330 may include a keyboard, keypad 220, display 225, a touchpad, a mouse, a button, a switch, microphone 210, an input port, voice recognition logic, and/or some other type of input component. Output 335 may permit user device 110 to output information to a user and/or another device. For example, output 335 may include speaker 215, display 225, one or more light emitting diodes (LEDs), an output port, a vibrator, and/or some other type of visual, auditory, tactile, etc., output component.

Accelerometer 340 may permit user device 110 to measure or calculate acceleration. Based on such measurements or calculations, user device 110 may be capable of calculating other types of mobility information (e.g., velocity, speed). Accelerometer 340 may provide mobility information (e.g., acceleration, velocity, speed, etc.) associated with user 105/user device 110 to communication interface 320, as described in greater detail below.

Figure 4:
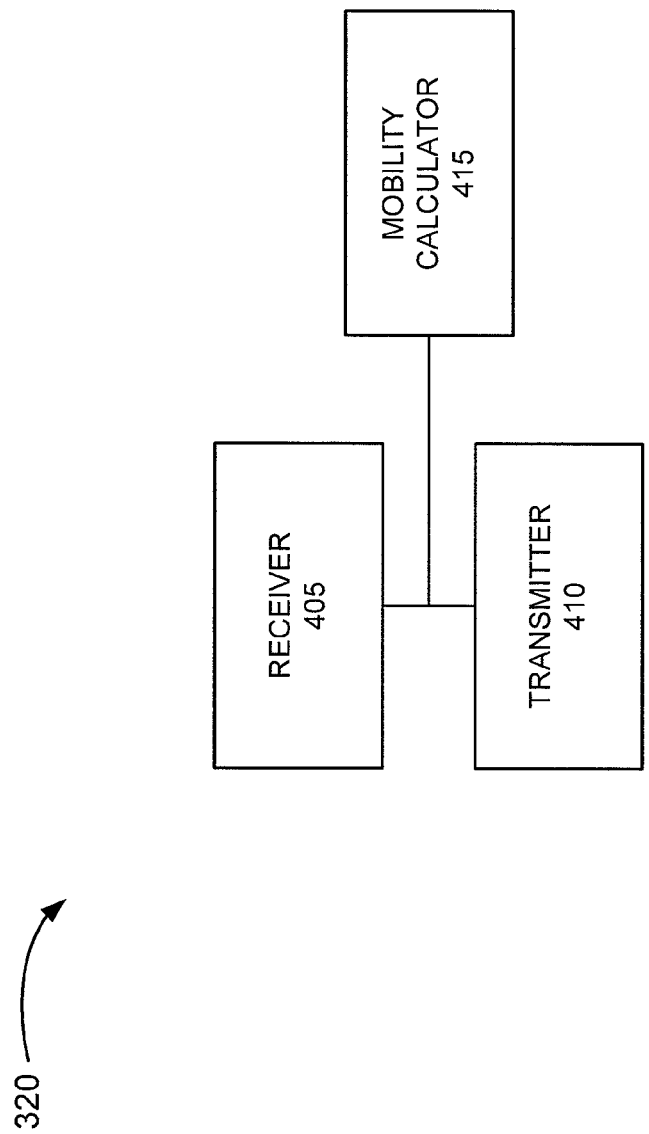
FIG. 4 is a diagram illustrating exemplary components of a communication interface depicted in FIG. 3.

FIG. 4 is a diagram of an exemplary embodiment of communication interface 320. As illustrated, communication interface 320 may include a receiver 405, a transmitter 410, and a mobility calculator 415. In other implementations, communication interface 320 may include fewer, additional, and/or different components than those illustrated in FIG. 4 and described herein. Mobility calculator 415 may be implemented in hardware (e.g., processing system 305) or a combination of hardware and software (e.g., applications 315). In some implementations, mobility calculator 415 may be implemented in or be considered a part of GPS receiver 325.

Receiver 405 may receive wireless signals. Receiver 405 may include, for example, a RAKE receiver, a Generalized RAKE (GRAKE) receiver, a chip equalizer, a Decorrelating RAKE (DRAKE) receiver, a Multiple Input Multiple Output (MIMO) receiver, a Single Input Multiple Output (SIMO) receiver, a Multiple Input Single Output (MISO) receiver, or some other type of wireless receiver. Receiver 405 may process wireless signals. For example, receiver 405 may perform de-modulation, de-interleaving, equalization, filtering, de-coding, channel estimation, estimations related to signal-to-noise (SN), estimations related to signal-to-interference-to-noise (SIN), estimations related to channel fading, error control, or other types of processing related to receiving wireless signals. Receiver 405 may be capable of operating in, for example, one or more of a Frequency Division Multiple Access (FDMA) scheme, a Time Division Multiple Access (TDMA) scheme, a Code Division Multiple Access (CDMA) scheme, or a Wideband CDMA (WCDMA) scheme.

Receiver 405 may process wireless signals in an adaptive manner (e.g., in a closed-loop system and/or in an open-loop system). In one embodiment, receiver 405 may receive and/or process wireless signals based on mobility information provided by mobility calculator 415.

Transmitter 410 may process wireless signals. For example, transmitter 410 may perform modulation, interleaving, equalization, encoding, power control, error control, channel estimation, or other types of processing related to transmitting wireless signals. Transmitter 410 may include, for example, a MIMO transmitter, a SIMO transmitter, a MISO transmitter, or some other type of wireless transmitter. Transmitter 410 may be capable of operating in, for example, one or more of a FDMA scheme, a TDMA scheme, a CDMA scheme, or a WCDMA scheme.

Transmitter 410 may process wireless signals in an adaptive manner (e.g., in a closed-loop system). In one embodiment, transmitter 410 may transmit and/or process wireless signals based on mobility information provided by mobility calculator 415.

Mobility calculator 415 may calculate mobility information. In one implementation, mobility calculator 415 may calculate mobility information based on GPS signals or some other form of position-based signals. Mobility calculator 415 may provide mobility information to receiver 405. Mobility calculator 415 may provide mobility information to transmitter 410.

Exemplary Process

Figure 5:
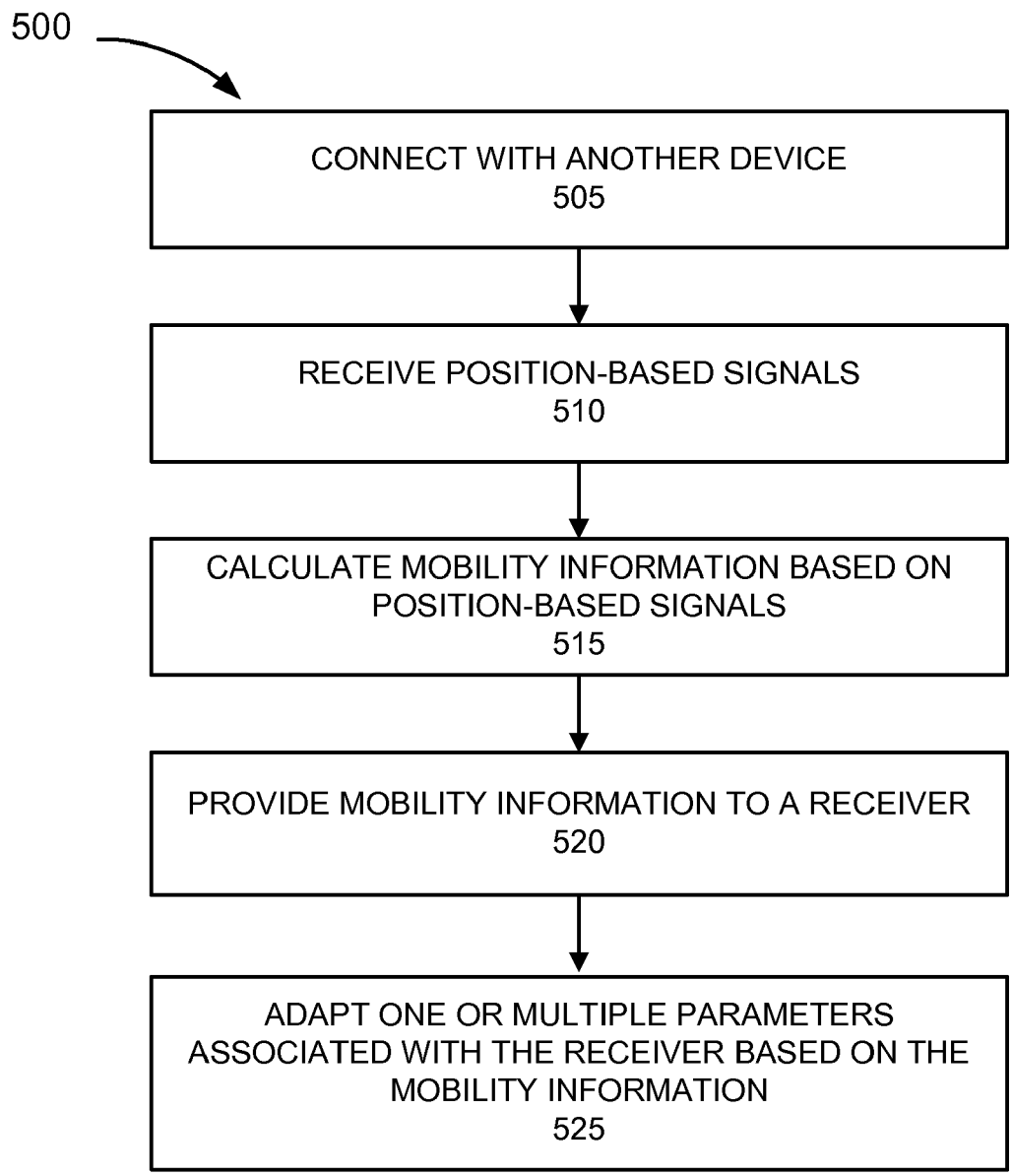
FIG. 5 is a flow diagram illustrating an exemplary process for adapting one or more parameters associated with a receiver of the user device depicted in FIGS. 2-4.

FIG. 5 is a flow diagram illustrating an exemplary process 500 for adapting one or more parameters associated with a wireless receiver (e.g., receiver 405). Process 500 may also be utilized to adapt one or more parameters associated with a wireless transmitter (e.g., transmitter 410). Components of user device 110 described as performing a particular operation of process 500, may, in other implementations, be performed by other components of user device 110, or may be performed in combination with other components of user device 110.

Process 500 may begin with a user device connecting with another device (block 505). For example, user device 110 may establish a connection with a base station 125 or some other type of wireless device associated with network 115.

Position-based signals may be obtained (block 510). For example, in one implementation, GPS receiver 325 of user device 110 may receive GPS signals 130 from GPS network 120. In other implementations, user device 110 (e.g., via communication interface 320) may receive position-based signals from other types of systems (e.g., IPS, triangulation, etc.).

Mobility information may be calculated based on the position-based signals (block 515). For example, mobility calculator 415 of user device 110 may calculate mobility information 135. Mobility information 135 may include geographic positional information associated with user 105/user device 110. As previously described, mobility information 135 may include, for example, whether user 105/user device 110 is stationary or moving. Mobility information 135 may include speed, velocity, acceleration, and/or other types of navigation information associated with user 105/user device 110. In one implementation, GPS receiver 325 may calculate speed, velocity, acceleration, and/or other types of navigation information based on continual geographic positional information. Additionally, or alternatively, GPS receiver 325 may determine mobility information based on a changing characteristic of the received GPS signals 130 (e.g., a Doppler frequency shift) with respect to a corresponding changing position of GPS receiver 325.

Accelerometer 340 may calculate mobility information 135 (e.g., acceleration) and/or mobility calculator 415 may calculate (e.g., velocity, speed, etc.) based on the acceleration calculated by accelerometer 340. In one embodiment, as will be described below, mobility information 135 provided by accelerometer 135 may be utilized when, for example, user device 110 loses a connection with position-based signals (e.g., a GPS connection).

Mobility information may be provided to a receiver (block 520). For example, mobility information 135 may be provided to receiver 405 of user device 110. In another implementation, mobility information 135 may be provided to transmitter 410 of user device 110.

One or multiple parameters associated with the receiver may be adapted based on the mobility information (block 525). As previously described, mobility information 135 may be utilized to adapt one or multiple parameters associated with receiver 405 of user device 110. Transmitter 410 of user device 110 may also adapt one or multiple parameters based on mobility information 135. In one embodiment, where mobility information 135 (e.g., velocity of user 105/user device 110) may be obtained from other sources (e.g., Doppler estimation), mobility information 135 may be used to supplement Doppler estimates. In one implementation, mobility information 135 may be averaged with the Doppler estimate. In another implementation, mobility information 135 may be used to expedite the Doppler estimate. For example, mobility information 135 may be considered an initial estimate of velocity, which may expedite and/or improve the accuracy of the Doppler estimate. In still another implementation, when channel conditions prohibit or degrade the accuracy of Doppler estimation, mobility information 135 may be utilized. For example, Doppler estimation may be affected (e.g., cause a frequency shift) by moving objects (e.g., vehicles) and/or precipitation (e.g., rain, snow).

In another embodiment, when mobility information 135 may not be obtained from another source, mobility information 135 associated with position-based signals may be utilized to adapt one or multiple parameters of receiver 405 and/or transmitter 410. In still another embodiment, when mobility information 135 associated with position-based signals may not be obtained, accelerometer 340 may be utilized to estimate mobility information 135. For example, in an exemplary scenario, user 105 may be driving in a tunnel and position-based signals (e.g., GPS signals 130) may be lost. At the time the position-based signals are lost, user device 110 may have a velocity estimate at time $t_0$. A time dependent acceleration a(t) provided from accelerometer 340 may be utilized to predict a velocity at time t>$t_0$ based on the following exemplary expression:

$$\vec{v}(t) = \vec{v}_{GPS}(t_0) + \int_{\tau 0}^{\tau} \vec{a}(\tau)d\tau \qquad (1)$$

One or multiple parameters associated with receiver 405 and/or transmitter 410 may be adapted based on the mobility information. For example, receiver 405 may utilize mobility information 135 to adapt channel estimation coefficients, channel fading coefficients, and/or pre-filtering coefficients (e.g., a pre-filter RAKE). Additionally, or alternatively, transmitter 410 may utilize mobility information to adapt power control decisions. For example, signal-to-noise-ratio (SINR) estimates may be used to adapt power control decisions. In such instances, the mobility information may be utilized to, for example, supplement SINR estimates to adapt power control decisions. In another implementation, user device 110 may obtain geographic location information associated with, for example, a base station to which user device 110 is communicating. When user device 110 obtains the geographic location of the base station, user device 110 may determine whether user device 110 is moving away from or towards the base station based on the mobility information. In such an instance, user device 110 may adapt power control decisions with respect to transmitter 410. For example, when user device 110 determines that user device 110 is moving away from the base station, user device 110 may increase transmit power. Conversely, when user device 110 determines that user device 110 is moving toward from the base station, user device 110 may decrease transmit power.

Although FIG. 5 illustrates an exemplary process 500, in other implementations, process 500 may include fewer, different, and/or additional operations than those described.

Conclusion

The foregoing description of implementations provides illustration, but is not intended to be exhaustive or to limit the implementations to the precise form disclosed. Modifications and variations are possible in light of the above teachings or may be acquired from practice of the teachings. For example, mobility information 135 may be provided to network 115 (e.g., base station 125). In one implementation, user device 110 may provide network 115 with mobility information 135 in a feedback message, which may include channel quality indicators (CQIs). Base station 125 may manage power, hand-over, and other types of communication-related decisions (e.g., interleaving length determinations) based on mobility information 135. In some implementations, mobility information 135 may supplement mobility information derived from and/or originating from other sources and/or techniques.

It should be emphasized that the term "comprises" or "comprising" when used in the specification is taken to specify the presence of stated features, integers, steps, or components but does not preclude the presence or addition of one or more other features, integers, steps, components, or groups thereof.

In addition, while a series of blocks has been described with regard to the process illustrated in FIG. 5, the order of the blocks may be modified in other implementations. Further, non-dependent blocks may be performed in parallel. Further one or more blocks may be omitted.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such. Also, as used herein, the article "a" and "an" are intended to include one or more items. Where only one item is intended, the term "one" or similar language is used. Further, the phrase "based on" is intended to mean "based, at least in part, on" unless explicitly stated otherwise. As used herein, the term "and/or" includes any and all combinations of one or more of the associated list items.

What is claimed is:

1. A method, comprising:
   establishing, by a user device, one or more operating parameters associated with communications with another device via at least one base station;
   determining, during the communications, that the user device is operating in conditions that affect an accuracy of first mobility information, associated with the user device, determined using Doppler estimation;
   receiving, by the user device, position-based signals associated with the user device;
   calculating, by the user device and based on the position-based signals, second mobility information associated with the user device;
   providing, by the user device, the second mobility information, in place of the first mobility information, to a receiver of the user device; and
   adapting, by the user device, the one or more operating parameters, associated with the communications, based on the second mobility information.

2. The method of claim 1, wherein adapting the one or more operating parameters comprises:
   adapting channel estimation coefficients.

3. The method of claim 1, wherein adapting the one or more operating parameters comprises:
   adapting channel fading coefficients.

4. The method of claim 1, further comprising:
   determining, based on the second mobility information, that the user device is moving toward the at least one base station or away from the at least one base station;
   providing, by the user device, the second mobility information to a transmitter of the user device; and
   adapting, by the user device, power control parameters associated with a transmission between the transmitter and the at least one base station based on the second mobility information, including:
   increasing power associated with the transmission when the user device is moving away from the at least one base station, or
   decreasing the power associated with the transmission when the user device is moving away from the at least one base station.

5. The method of claim 1, further comprising:
   determining that the conditions include a presence of at least one of:
   moving vehicles, or
   precipitation; and
   supplementing the Doppler estimation of a velocity of the user device with the second mobility information that includes a velocity estimate of the user device.

6. The method of claim 1, further comprising:
   supplementing a signal-to-noise-estimate with the second mobility information when adapting the one or more operating parameters associated with power control for the communications.

7. The method of claim 1, wherein determining that the user device is operating in conditions that affect an accuracy of first mobility information comprises detecting a frequency shift associated with the conditions, the method further comprising:
   estimating third mobility information from an accelerometer, of the user device, when the position-based signals are not received.

8. A user device configured to:
   connect, via a communication channel, to a wireless network based on one or more operating parameters;
   determine that existing conditions, associated with the communication channel, adversely affect Doppler estimation for the user device;
   receive geographic location information of the user device;
   calculate mobility information based on the geographic location information;

provide the mobility information, instead of the Doppler estimation, to at least one of a receiver or a transmitter of the user device; and adapt, based on the mobility information, the one or more operating parameters associated with the communication channel.

9. The user device of claim 8, wherein the user device is further configured to:

calculate an estimate of a velocity of the user device, based on the Doppler estimation, associated with a transmission from the wireless network to the user device, wherein the mobility information includes another estimate of the velocity of the user device; and average the estimate of the velocity of the user device that is based on the Doppler estimation and the other estimate of the velocity of the user device to adapt the one or more operating parameters.

10. The user device of claim 8, wherein the mobility information includes an estimate of a velocity of the user device, and the user device is further configured to:

determine that the existing conditions include a presence of at least one of:
moving vehicles, or
precipitation;

utilize the estimate of the velocity of the user device as an initial estimate; and calculate another estimate of a velocity of the user device based on the Doppler estimation and the initial estimate.

11. The user device of claim 8, wherein the user device includes a wireless telephone.

12. The user device of claim 8, wherein the geographic location information includes global positioning system signals.

13. The user device of claim 8, wherein the user device is further configured to:

provide the mobility information to the wireless network via a base station;

determine, based on the mobility information, that the user device is moving toward the base station or away from the base station;

increase transmission power over the communication channel when the user device is moving away from the base station; and decrease the transmission power when the user device is moving away from the base station.

14. The user device of claim 8, wherein the one or more operating parameters include pre-filtering parameters.

15. The user device of claim 8, wherein the one or more operating parameters include channel estimation coefficients.

16. The user device of claim 8, wherein the one or more operating parameters include channel fading coefficients.

17. The user device of claim 8, wherein the user device is further configured to:

detect a frequency shift associated with the existing conditions with respect to the Doppler estimation; and calculate a velocity of the user device based on the Doppler estimation and the mobility information.

18. A non-transitory computer-readable medium containing instructions executable by at least one processor, the non-transitory computer-readable medium storing instructions for:

obtaining position-based signals associated with a mobile device;

calculating a first estimate of a velocity of the mobile device based on the position-based signals;

calculating another estimate of the velocity of the mobile device based on a Doppler estimation;

determining existing conditions in which the mobile device is operating;

detecting a frequency shift associated with the existing conditions, that affects an accuracy of the other estimate;

adapting one or more operating parameters associated with a transceiver of the mobile device based on the first estimate, and not based on the other estimate, of the velocity of the mobile device.

19. The non-transitory computer-readable medium of claim 18, wherein the one or more operating parameters include at least one of a power control parameter, a filtering parameter, a channel estimation parameter, or a channel fading parameter, and the existing conditions include a presence of at least one of moving vehicles or precipitation.

20. The non-transitory computer-readable medium of claim 18, wherein the mobile device includes the computer-readable medium and the non-transitory computer-readable medium further stores instructions for:

communicating via a communication channel to a base station;

determine, based on the mobility information, that the mobile device is moving toward the base station or away from the base station;

increase transmission power over the communication channel when the user device is moving away from the base station; and decrease the transmission power when the user device is moving away from the base station.

* * * * *